United States Patent Office 3,150,137
Patented Sept. 22, 1964

---

3,150,137
CARBAMATE DERIVATIVE OF 5-HYDROXY-ALKYLMALONYL UREAS
André Buzas, 25 Rue Leon Mignotte, Bievres, France
No Drawing. Filed Mar. 12, 1962, Ser. No. 179,227
Claims priority, application France Mar. 24, 1961
1 Claim. (Cl. 260—256.4)

This invention relates to a novel derivative of 5-hydroxyalkylmalonyl urea.

A large number of derivatives of malonyl urea or barbituric acid are already known. These barbituric derivatives are widely used for therapeutic purposes, being used as sedatives and more particularly as hypnotics. The hypnotic nature of barbituric derivatives makes it difficult to use them in therapeutics as sedatives, for the patient is disturbed in his normal activities, not to mention the fact that many barbituric derivatives are toxic.

It is an object of this invention to provide a novel barbituric derivative which is of use for treating humans and animals and which obviates the disadvantages just outlined.

The derivative according to the invention is the derivative having the following structural formula:

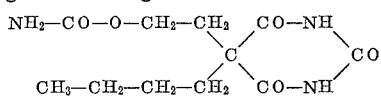

The melting point of this derivative is 192° C. (with sublimation) as determined with a Kofler block.

This derivative is in the form of a white microcrystalline bitter-tasting powder which is insoluble in cold water, sparingly soluble in alcohol and acetone and ether and soluble in alkaline liquors. Parri's reaction can be used to identify the carbamate according to the invention: A few milligrams of this product are dissolved in 5 cc. of absolute ethyl alcohol, 1 cc. of 3/1000 cobalt nitrate, then two drops of diethylamine are added to the absolute alcohol and a strong violet colour is obtained.

The derivative according to the invention can be combined with mineral or organic bases such as sodium hydrate or piperazine or morpholine to give water-soluble salts. The invention also applies to the pharmaceutically usable addition salts thus produced.

The derivative according to the invention has a tranquilizing and a sedative effect on humans and animals and is devoid of hypnotic action and toxicity at the normal therapeutic doses. The derivative according to the invention is therefore of use in the treatment of emotional upsets, anxiety, excitement and irritability in subjects suffering from cerebral atherosclerosis, palpitations, tremblings and neuro-vegetative disorders. This derivative is also of use for the treatment of spasmodic digestive and circulatory conditions.

Of 40 patients suffering from disorders of the kind just outlined who were treated with 5-beta-hydroxyethyl-5-butyl-malonyl urea carbamate at the rate of 100 to 150 mg./day, there was a 65% success rate—a considerable proportion considering the resistance usually offered to conventional sedatives by the pathological manifestations described. No side effects were noticed; in particular there was no change in the hepatic and blood condition of the patients. The product is therefore completely non-toxic, and this was confirmed by tests on animals showing that the $LD_{50}$ is 1.4 g./kg.

The preferred pharmaceutical form of the product is divisible tablets, each containing from 50 to 100 mg. of the active substance, to be taken via the mouth.

By way of example, the following formula may be mentioned for divisible tablets weighing 0.25 g.:

| | Grams |
|---|---|
| 5-beta-hydroxyethyl-5-butyl-malonyl urea carbamate | 0.05 |
| Lactose | 0.10 |
| Kaolin | 0.017 |
| Sugar | 0.024 |
| Starch | 0.055 |
| Levilite | 0.002 |
| Magnesium stearate | 0.002 |
| | 0.250 |

The industrial manufacture of such tablets is not associated with any difficulty for the required ingredients are conventional and well known by the experts in the art.

The invention also provides a process for preparing substituted 5-beta-hydroxyethyl-5-butyl-malonyl urea carbamate from hydroxyalkylmalonylureas. These latter derivatives are known and can be prepared inter alia either by the action of vinyloxyethyl-beta-chloroethane on a sodium-ethyl alkyl malonate, followed by a condensation on the urea and by a devinylation in an acid medium (Cretcher et al. J. Am. Chem. Soc. 47 3083–1925), or by ethylene dibromide being fixed on a sodium-ethyl alkyl malonate, followed by a lactonization by heating and by a condensation of the alpha-alkyl-alpha-carboxyethyl-butyrolactone on urea (Skinner et al. J. Am. Chem. Soc. 56 1339–1934 and 75 3031–1953).

More exactly, the reactions can be stated as follows, the reference Q—OH denoting the 5-beta-hydroxyethyl-5-butyl-malonyl urea which is used as starting material, while the reference Bs denotes the organic base used. In a first stage:

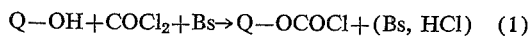

Clearly, the phosgene converts the alcohol function of the hydroxyalkyl malonyl urea into chlorocarbonate, the base Bs serving to fix the hydrochloric acid formed. This base must not react with the phosgene. Tertiary bases such as trimethylamine, pyridine, dimethylaniline or phenyl-dimethyl-pyrazolone are very suitable.

In the second stage of the reaction, the 5-beta-hydroxyethyl-5-butyl-malonyl urea chlorocarbonate is converted into carbamate by an excess of ammonia:

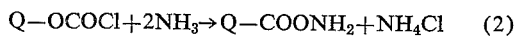

Preferably, the reactions are performed at a low temperature of 10° C. or less in order to inhibit secondary reactions and the evolution of phosgene.

The following example illustrates the invention.

EXAMPLE 1

*Preparation of 5-Beta-Hydroxyethyl-5-Butyl-Malonyl Urea Carbamate*

0.04 mol (or 9.1 g.) of 5-hydroxyethyl-5-butyl-malonyl urea is dissolved hot in 240 cc. of absolute dioxane and there is added the tertiary base formed by a solution of 0.045 mol (or 7.6 g.) of phenyldimethyl pyrazolone (antipyrine) in 40 cc. of chloroform. The mixture is cooled with agitation in an iced water bath. When the temperature is only from 8 to 10° C., 0.06 mol of phosgene —i.e., 30 cc. of 20% phosgene in toluene—is added and the temperature is maintained. The antipyrine hydrochloride separates out immediately after the addition. Agitation is effected at a temperature of from 15 to 20° C. for 8 hours and then the mixture is left to stand at 20° C. over night. The mixture is cooled and the antipyrine hydrochloride filtered off is washed with ice cold dioxane. The filtrate is cooled to from 0 to 5° C. A stream of dry ammonia gas is then bubbled slowly through the filtrate with agitation, for 8 hours, the temperature being kept below 10° C. The mixture is then left to stand over night and the mixture is then cooled with ice. The precipitate, which is a mixture of ammonium chloride and of the required carbamate, is separated by vacuum filtration treatment, whereafter the precipitate is extracted with boiling alcohol. The previous alcohol extract and the filtrate are then combined, concentrated in vacuo and then left to crystallize. The crystals collected after filtration in vacuo, when washed in ether and dried, weigh 9 g. and have a melting point of 192° C.

What I claim is:

The carbamate of 5-beta-hydroxyethyl-5-butyl-barbituric acid.

References Cited in the file of this patent

UNITED STATES PATENTS

| | | |
|---|---|---|
| 2,527,240 | Baird et al. | Oct. 24, 1950 |
| 2,605,209 | Bray | July 29, 1952 |
| 2,651,658 | Bohl | Sept. 8, 1953 |
| 2,882,159 | Brooker et al. | Apr. 14, 1959 |
| 2,995,489 | Schmidt | Aug. 8, 1961 |
| 3,075,981 | Surrey | Jan. 29, 1963 |
| 3,075,983 | Gold-Aubert | Jan. 29, 1963 |

OTHER REFERENCES

Bohme et al.: Chem. Abstracts, vol. 51, pages 1945 (1957).

Burger: Medicinal Chemistry (New York, 1960), pages 358–68.